United States Patent
Blake et al.

(10) Patent No.: US 10,997,083 B2
(45) Date of Patent: May 4, 2021

(54) PARALLEL PAGE TABLE ENTRY ACCESS WHEN PERFORMING ADDRESS TRANSLATIONS

(71) Applicant: Arm Limited, Cambridge (GB)

(72) Inventors: Geoffrey Wyman Blake, Austin, TX (US); Prakash S. Ramrakhyani, Austin, TX (US); Andreas Lars Sandberg, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 16/120,637

(22) Filed: Sep. 4, 2018

(65) Prior Publication Data

US 2020/0073819 A1   Mar. 5, 2020

(51) Int. Cl.
*G06F 12/00* (2006.01)
*G06F 13/00* (2006.01)
*G06F 12/1009* (2016.01)
*G06F 12/0802* (2016.01)

(52) U.S. Cl.
CPC ...... *G06F 12/1009* (2013.01); *G06F 12/0802* (2013.01); *G06F 2212/1024* (2013.01); *G06F 2212/651* (2013.01)

(58) Field of Classification Search
CPC ............. G06F 12/1009; G06F 12/0802; G06F 2212/1024; G06F 2212/651
USPC .......................................................... 711/3
See application file for complete search history.

(56) References Cited

U.S. PATENT DOCUMENTS

| | | | | |
|---|---|---|---|---|
| 5,696,925 A | * | 12/1997 | Koh | G06F 12/1036 711/202 |
| 5,729,710 A | * | 3/1998 | Magee | G06F 9/544 711/203 |
| 5,963,984 A | * | 10/1999 | Garibay, Jr. | G06F 12/1027 711/202 |
| 6,061,773 A | * | 5/2000 | Harvey | G06F 12/0882 711/206 |
| 6,356,902 B1 | * | 3/2002 | Tan | G06F 16/40 |
| 2003/0200402 A1 | * | 10/2003 | Willman | G06F 12/145 711/154 |
| 2004/0267785 A1 | * | 12/2004 | Suontausta | G06F 16/322 |
| 2006/0161719 A1 | * | 7/2006 | Bennett | G06F 12/109 711/6 |

(Continued)

*Primary Examiner* — Sheng Jen Tsai
(74) *Attorney, Agent, or Firm* — Nixon & Vanderhye P.C.

(57) ABSTRACT

Address translation circuitry performs virtual-to-physical address translations using a page table hierarchy of page table entries, wherein a translation between a virtual address and a physical address is defined in a last level page table entry of the page table hierarchy. The address translation circuitry is responsive to receipt of the virtual address to perform a translation determination with reference to the page table hierarchy, wherein an intermediate level page table entry of the page table hierarchy stores an intermediate level pointer to the last level page table entry. The translation determination comprises: calculating a higher level pointer to the intermediate level page table entry by applying a first predetermined function to the virtual address, calculating the intermediate level pointer by applying a second predetermined function to the virtual address, and initiating a memory access to retrieve in parallel the intermediate level pointer from the intermediate level page table entry and the translation from the last level page table entry.

19 Claims, 9 Drawing Sheets

(56) References Cited

U.S. PATENT DOCUMENTS

| | | | | |
|---|---|---|---|---|
| 2008/0301398 A1* | 12/2008 | Falik | ............ | G06F 9/342 711/206 |
| 2010/0250869 A1* | 9/2010 | Adams | ............ | G06F 12/0891 711/154 |
| 2011/0307423 A1* | 12/2011 | Shotton | ............ | G06N 5/003 706/12 |
| 2012/0297139 A1* | 11/2012 | Choi | ............ | G06F 12/1027 711/122 |
| 2013/0179377 A1* | 7/2013 | Oberg | ............ | G06K 9/6282 706/45 |
| 2013/0262835 A1* | 10/2013 | Arakawa | ............ | G06F 9/3887 712/220 |
| 2014/0006734 A1* | 1/2014 | Li | ............ | G06F 9/45558 711/162 |
| 2014/0156949 A1* | 6/2014 | Chakrala | ............ | G06F 11/073 711/144 |
| 2014/0380009 A1* | 12/2014 | Lemay | ............ | G06F 9/45558 711/163 |
| 2015/0058580 A1* | 2/2015 | Lagar Cavilla | ............ | G06F 3/0683 711/149 |
| 2015/0370728 A1* | 12/2015 | Yamada | ............ | G06F 12/1416 711/163 |
| 2015/0379427 A1* | 12/2015 | Dirac | ............ | G06N 20/00 706/12 |
| 2016/0140048 A1* | 5/2016 | Mukherjee | ............ | G06F 12/128 711/135 |
| 2016/0246732 A1* | 8/2016 | Shanbhogue | ............ | G06F 12/1009 |
| 2016/0378678 A1* | 12/2016 | Lemay | ............ | G06F 12/1027 711/163 |
| 2017/0212837 A1* | 7/2017 | Breternitz | ............ | G06F 12/0833 |
| 2017/0262306 A1* | 9/2017 | Wang | ............ | G06F 9/50 |
| 2017/0277634 A1* | 9/2017 | Basu | ............ | G06F 12/0808 |
| 2017/0277639 A1* | 9/2017 | Awad | ............ | G06F 12/1036 |
| 2017/0277640 A1* | 9/2017 | Jin | ............ | G06F 12/1054 |
| 2018/0067866 A1* | 3/2018 | Shanbhogue | ............ | G06F 11/0712 |
| 2019/0138219 A1* | 5/2019 | Gschwind | ............ | G06F 12/1027 |
| 2019/0138436 A1* | 5/2019 | Gschwind | ............ | G06F 12/109 |
| 2019/0138441 A1* | 5/2019 | Gschwind | ............ | G06F 12/0253 |
| 2019/0265976 A1* | 8/2019 | Goryavskiy | ............ | G06F 9/30054 |
| 2019/0377686 A1* | 12/2019 | Shirahige | ............ | G06F 12/0875 |
| 2020/0242047 A1* | 7/2020 | Evans | ............ | G06F 16/2282 |

* cited by examiner

PARALLEL PAGE TABLE ENTRY ACCESS WHEN PERFORMING ADDRESS TRANSLATIONS

TECHNICAL FIELD

The present disclosure relates to data processing. In particular, the present disclosure relates to address translation in a data processing apparatus.

DESCRIPTION

A data processing apparatus may adopt the memory management technique of allowing processes executing within the data processing apparatus to reference an abstraction of the memory available, which is commonly referred to as "virtual memory", and in doing so to use virtual addresses to specify (virtual) storage locations in memory. In order to support this the data processing apparatus needs to be able to translate virtual addresses into physical addresses, where the latter refer to real physical storage locations within the memory. One particular approach to this technique is to define translations between virtual and physical addresses in page table entries, where these page table entries are themselves stored in defined locations in (physical) memory and moreover the page table entries may be arranged in a hierarchical structure, such that to find the translation for a given virtual address a path must be followed (by means of pointers) through the page table hierarchy from a "common root node" to a particular "leaf node" specifying the translation. This process of following a path through the page table hierarchy may be referred to as a page table walk. As memory systems grow larger and the memory spaces to which virtual addresses and physical addresses refer grow correspondingly larger the complexity and latency of such page table walks also grows. Indeed, this may be to such an extent that the virtual to physical address translation path in such systems may become a significant bottle neck.

SUMMARY

In one example embodiment described herein there is an apparatus comprising: address translation circuitry to perform virtual-to-physical address translations using a page table hierarchy of page table entries, wherein a translation between a virtual address and a physical address is defined in a last level page table entry of the page table hierarchy, wherein the address translation circuitry is responsive to receipt of the virtual address to perform a translation determination with reference to the page table hierarchy, wherein an intermediate level page table entry of the page table hierarchy stores an intermediate level pointer to the last level page table entry, and wherein the translation determination comprises: calculating a higher level pointer to the intermediate level page table entry by applying a first predetermined function to the virtual address; calculating the intermediate level pointer by applying a second predetermined function to the virtual address; and initiating a memory access to retrieve in parallel the intermediate level pointer from the intermediate level page table entry and the translation from the last level page table entry.

In one example embodiment described herein there is a method of operating address translation circuitry to perform virtual-to-physical address translations, the method comprising the steps of: defining a page table hierarchy of page table entries, wherein a translation between a virtual address and a physical address is defined in a last level page table entry of the page table hierarchy; and in response to receipt of the virtual address, performing a translation determination with reference to the page table hierarchy, wherein an intermediate level page table entry of the page table hierarchy stores an intermediate level pointer to the last level page table entry, and wherein performing the translation determination comprises: calculating a higher level pointer to the intermediate level page table entry by applying a first predetermined function to the virtual address; calculating the intermediate level pointer by applying a second predetermined function to the virtual address; and initiating a memory access to retrieve in parallel the intermediate level pointer from the intermediate level page table entry and the translation from the last level page table entry.

In one example embodiment described herein there is an apparatus for performing virtual-to-physical address translations, the apparatus comprising: means for defining a page table hierarchy of page table entries, wherein a translation between a virtual address and a physical address is defined in a last level page table entry of the page table hierarchy; and means for performing a translation determination with reference to the page table hierarchy, in response to receipt of the virtual address, wherein an intermediate level page table entry of the page table hierarchy stores an intermediate level pointer to the last level page table entry, and wherein the means for performing the translation determination comprises: means for calculating a higher level pointer to the intermediate level page table entry by applying a first predetermined function to the virtual address; means for calculating the intermediate level pointer by applying a second predetermined function to the virtual address; and means for initiating a memory access to retrieve in parallel the intermediate level pointer from the intermediate level page table entry and the translation from the last level page table entry.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1A:
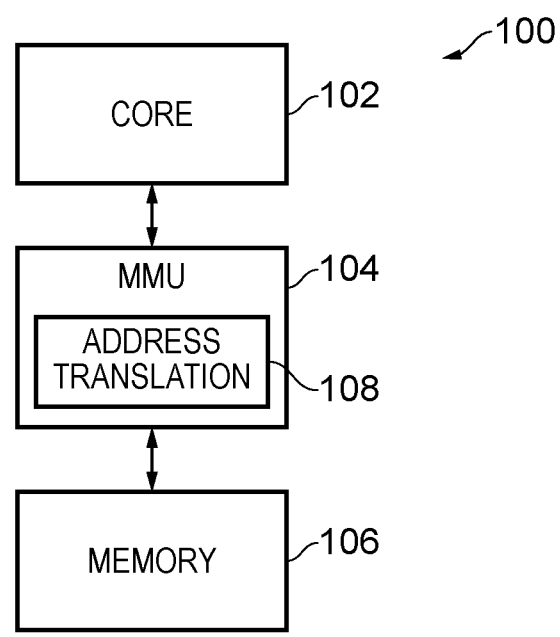
FIG. 1A schematically illustrates a data processing system comprising address translation circuitry in one example embodiment.

Before discussing the embodiments with reference to the accompanying figures, the following description of embodiments is provided.

In accordance with one example configuration there is provided an apparatus comprising: address translation circuitry to perform virtual-to-physical address translations using a page table hierarchy of page table entries, wherein a translation between a virtual address and a physical address is defined in a last level page table entry of the page table hierarchy, wherein the address translation circuitry is responsive to receipt of the virtual address to perform a translation determination with reference to the page table hierarchy, wherein an intermediate level page table entry of the page table hierarchy stores an intermediate level pointer to the last level page table entry, and wherein the translation determination comprises: calculating a higher level pointer to the intermediate level page table entry by applying a first predetermined function to the virtual address; calculating the intermediate level pointer by applying a second predetermined function to the virtual address; and initiating a memory access to retrieve in parallel the intermediate level pointer from the intermediate level page table entry and the translation from the last level page table entry.

The present techniques propose a way of carrying out address translation which is based on a particular approach to the allocation of memory for page table entries forming a page table hierarchy. In particular, rather than laying out the page table hierarchy in memory in an ad hoc manner across the available physical address space, an approach is taken in which a contiguous region of physical address space is used for at least a portion of the page table hierarchy, in particular one in which the memory allocation covers page table entries at the highest level (root node) page table entry level of the page table hierarchy through to a lowest level (leaf node) at which translations are to be found. Moreover the allocation of page table entries in the physical address space is made according to a predetermined relationship between (at least a portion of) the virtual address and the physical storage location (i.e. address) of a page table entry. Importantly, this means that the physical addresses of page table entries at different levels of the page table hierarchy can be determined as a calculation making use of the predetermined function and the relevant portion of the virtual address. This therefore means that it is not necessary, in order to retrieve the translation itself from a last level page table entry, to carry out a page table walk which traverses the entire page table hierarchy, since the physical addresses of the linked page table entries (including that last level page table entry) can be calculated directly from the virtual address and memory accesses to those physical storage locations can be directly made. Moreover, these memory accesses to the different levels of the page table hierarchy can be made in parallel, thus parallelizing what was previously a serial process.

The present techniques are not constrained to a particular number of levels of page table hierarchy, and the above example presents the present techniques with reference to one intermediate level, however in some example embodiments the page table hierarchy comprises multiple intermediate levels of page table entries and the higher level pointer is a further intermediate level pointer stored in a further intermediate level page table entry of the page table hierarchy, and wherein the translation determination further comprises: calculating a still higher level pointer to the further intermediate level page table entry by applying a third predetermined function to the virtual address; and initiating the memory access to further retrieve in parallel the further intermediate level pointer from the further intermediate level page table entry. In such an example embodiment the third predetermined function is therefore used to translate the virtual address into a physical address of (by means of a pointer to) the further intermediate level page table entry. Still further intermediate level page table entries may add further levels to the page table hierarchy and further predetermined functions for translating the virtual address into corresponding pointers may similarly be provided.

There are a variety of particular configurations for the above mentioned first and second predetermined functions with respect to the virtual address, but in some example embodiments calculating the higher level pointer to the intermediate level page table entry comprises applying the first predetermined function to a first portion of the virtual address, and calculating the intermediate level pointer comprises applying the second predetermined function to a second portion of the virtual address.

Accordingly, in such embodiments as further levels are added to the page table hierarchy further predetermined functions are defined to translate corresponding portions of the virtual address into a corresponding pointer for a page table entry in that level. Hence in some example embodiments calculating the still higher level pointer to the further intermediate level page table entry comprises applying the third predetermined function to a third portion of the virtual address.

In view of the above discussion of the present techniques it will be appreciated that the predetermined relationship between the virtual address, the levels of the page table hierarchy, and the physical address of the page table entries at the various levels of the page table hierarchy is predetermined, such that when memory is allocated for the page table hierarchy the relative storage location of the page table entries is predetermined. Nevertheless, it is not essential for the entire page table hierarchy to have its page table entries allocated in this manner and a portion of the page table hierarchy may be contiguously allocated whilst another portion may be sparsely allocated. However, when the present techniques are applied to page table entries which reach all the way to a leaf node of the page table hierarchy, i.e. a page table entry at which a translation is stored, this enables a virtual to physical address translation to be retrieved by means (in principle) of only a single memory access. In order to support this in some embodiments the apparatus is arranged to allocate memory for the page table hierarchy of page table entries by performing a depth-first allocation procedure for a first sub-tree of the page table hierarchy comprising the intermediate level page table entry and the last level page table entry, such that page table entries of the first sub-tree are allocated in a contiguous block of memory. A further benefit of the contiguous memory portion from which these page table entries are retrieved is to further speed up the access, because of the greater speed with which data in a contiguous block of memory can be accessed by comparison with data scattered across memory.

Beyond this first sub-tree of the page table hierarchy further sub-trees of the page table hierarchy may be variously handled with regard to their memory allocation, but in some embodiments the apparatus is arranged to perform at least one further depth-first allocation procedure for at least one further sub-tree of the page table hierarchy comprising at least one intermediate level page table entry and at least one last level page table entry, such that page table entries of the at least one further sub-tree are allocated in the contiguous block of memory. The contiguous block of memory may therefore extend to comprise not only the first sub-tree but also at least one further sub-tree of the page table hierarchy.

As mentioned above the contiguous memory allocation procedure according to the predetermined relationship between the virtual address and the physical storage location of the page table entries need not be carried out for the entire page table hierarchy. Accordingly in some embodiments the apparatus is arranged to perform a sparse allocation procedure for at least one further sub-tree of the page table hierarchy comprising at least one intermediate level page table entry and at least one last level page table entry, such that page table entries of the at least one further sub-tree are allocated in memory locations selected according to availability when the sparse allocation procedure is performed. Furthermore, the order in which page table entries are allocated with respect to their position in the page table hierarchy may vary and need not be depth-first as in the above mentioned example. Accordingly, in some embodiments the apparatus is arranged to allocate memory for the page table hierarchy of page table entries, wherein the memory allocation circuitry is arranged to perform a breadth-first allocation procedure for the page table hierarchy, such that page table entries in each level of the page table hierarchy are allocated in a contiguous block of memory. In other words, all page table entries at a given level of the page table hierarchy are allocated before proceeding to allocate page table entries at a next level of the page table hierarchy.

The ability of the present techniques to perform a parallel memory access to different levels of the page table hierarchy and in particular to directly access a last level page table entry at which the translation is stored evidently may improve the speed with which the translation is returned from memory (since it need not be accessed via a sequential page table walk), yet nevertheless the present techniques recognise that page table entries at each level of the page table hierarchy still need to point to one another in a valid sequence leading to the translation at the last level page table entry. Accordingly in addition to determining the translation from a virtual address to a physical address as described above further steps may be taken to verify that the translation is valid. In some embodiments the translation determination further comprises: verifying whether at least one of the intermediate level page table entry and the last level page table entry is an invalid page table entry; and when at least one of the intermediate level page table entry and the last level page table entry is found to be the invalid page table entry, initiating a page-table-walk from a pointer at a higher level than the invalid page table entry to retrieve the translation. Thus, even when an invalid page table entry is found the entire page table walk need not be carried out, but rather need only be performed from a (valid) pointer at a higher level than the page table entry which was found to be invalid.

The speed with which the present techniques may be able to provide an address translation (which can be beneficial in terms of performance) can be balanced in different ways against the relative importance of verifying whether the translation is valid. Accordingly in some embodiments the address translation circuitry is arranged to provide the address translation speculatively before the verifying whether at least one of the intermediate level page table entry and the last level page table entry is the invalid page table entry has been completed. Thus the recipient of the address translation, e.g. a processor core, may for example be allowed to speculatively continue data processing on this basis, allowing faster forward progress. Steps may be taken however to prevent such speculative address translation being a security risk, such as by providing transactional memory to ensure that erroneous translations can be rolled back. Nevertheless, the present techniques further recognise that in a data processing apparatus in which security is paramount even such transactional memory techniques may be deemed to be insufficient, for example because of the interim modification which may occur to the content of a cache, despite the fact that no lasting erroneous transaction remains in memory, and in such a security-conscious apparatus the above mentioned verification of translation validity may be required before providing the translation outside the address translation circuitry.

Whilst embodiments of the present techniques may be envisaged in which all page table entries are allocated in a contiguous manner, the present techniques further recognise that embodiments may be provided in which some page table entries are allocated according to the techniques described above for contiguous memory allocation whilst others may be allocated sparsely in an ad hoc manner in memory. In this context in some embodiments each page table entry of the page table hierarchy of page table entries comprises a contiguous allocation flag, and the apparatus is arranged to set the contiguous allocation flag for a first page table entry which points to a second page table entry which is allocated in the contiguous block of memory. Reference may then be made to that contiguous allocation flag in a given page table entry to determine whether the page table entry or sub-tree of page table entries which that pointer points to is (at least partially) laid out in a contiguous manner.

One particular use of the contiguous allocation flag is therefore to tell the address translation circuitry how a following level of the page table hierarchy of relevance to the present translation is laid out in memory and therefore in particular whether the physical address of a page table entry at that level can be calculated or must be followed via a pointer (i.e. via a page table walk). Accordingly, in some embodiments the address translation circuitry is responsive to receipt of a page table entry retrieved by the memory access for which the contiguous allocation flag is not set to initiate a page-table-walk from the page table entry for which the contiguous allocation flag is not set to retrieve the translation.

The contiguous allocation flag can therefore be set when the page table entries are allocated in dependence on the type of memory allocation carried out and in some embodiments the apparatus is arranged to: allocate memory in a first contiguous block for page table entries of a first set of levels of the page table hierarchy of page table entries and to set the contiguous allocation flag for the page table entries of the first set of levels; and allocate memory sparsely for page table entries of a second set of levels of the page table hierarchy of page table entries and to not set the contiguous allocation flag for the page table entries of the second set of levels.

The levels of the page table hierarchy at which the page table entries are contiguously allocated and sparsely allocated may be freely defined. In some examples an upper part of the page table hierarchy may take one form, whilst a lower part may take the other form. In other example embodiments the first set of levels of the page table hierarchy of page table entries and the second set of levels of the page table hierarchy of page table entries are at least partially interleaved. For example one or more highest levels of the hierarchy may take one form, a middle level or levels of the hierarchy may take the other form, and a lowest level or levels may take the first form again.

Although the present techniques enable the apparatus to perform address translations using parallel memory accesses to both an intermediate level pointer in an intermediate level page table entry and the translation in the last level page table entry, the apparatus may further be provided with the ability to switch off this parallelised memory access and to do so in dependence on a number of different conditions. For example the apparatus may monitor current memory bandwidth demand and only allow the parallel memory access to multiple levels of the page table hierarchy to be carried out when the memory bandwidth demand is currently below a given threshold. Accordingly, in some embodiments the apparatus further comprises memory performance monitoring circuitry to monitor current memory bandwidth demand, wherein the address translation circuitry is responsive to the current memory bandwidth demand being below a threshold to use the translation determination to retrieve the translation and is responsive to the current memory bandwidth demand being above the threshold to use a page-table-walk through the page table hierarchy to retrieve the translation. A decision as to whether to use the parallel memory access technique may also be based on other factors and in one example embodiment the apparatus further comprises virtual address confidence storage to store a confidence value in association with virtual addresses, wherein the address translation circuitry is responsive to the confidence value being above a threshold to use the translation determination to retrieve the translation and is responsive to the confidence value being below the threshold to use a page-table-walk through the page table hierarchy to retrieve the translation.

Thus when it is determined that the translation is reliably made (based on past performance which determines the confidence value stored) the storage location of the translation can be directly calculated and the translation quickly returned, whereas when the confidence value is below the threshold a page table walk technique can be used to be sure that the translation is correct. The confidence value may for example be increased when a successful page table walk has been carried out for a given virtual address.

The present techniques are also applicable in the context of a virtualisation environment. In such a configuration the present techniques may be nested, such that the described approach may be taken both for the translation of a virtual address into a intermediate physical address (guest physical address) and then to translate that guest physical address into a (real) physical address. Accordingly in some embodiments the apparatus is arranged to provide a hardware virtualization environment, and wherein the address translation circuitry is arranged to receive the virtual address from a guest machine running in the hardware virtualization environment, wherein the page table hierarchy is a guest page table hierarchy, and the translation is from the virtual address to a guest physical address, and wherein the address translation circuitry is responsive to the translation into the guest physical address to perform a further translation determination with reference to a host page table hierarchy to translate the guest physical address into a host physical address.

In accordance with one example embodiment configuration there is provided a method of operating address translation circuitry to perform virtual-to-physical address translations, the method comprising the steps of: defining a page table hierarchy of page table entries, wherein a translation between a virtual address and a physical address is defined in a last level page table entry of the page table hierarchy; and in response to receipt of the virtual address, performing a translation determination with reference to the page table hierarchy, wherein an intermediate level page table entry of the page table hierarchy stores an intermediate level pointer to the last level page table entry, and wherein performing the translation determination comprises: calculating a higher level pointer to the intermediate level page table entry by applying a first predetermined function to the virtual address; calculating the intermediate level pointer by applying a second predetermined function to the virtual address; and initiating a memory access to retrieve in parallel the intermediate level pointer from the intermediate level page table entry and the translation from the last level page table entry.

In accordance with one example configuration there is provided an apparatus for performing virtual-to-physical address translations, the apparatus comprising: means for defining a page table hierarchy of page table entries, wherein a translation between a virtual address and a physical address is defined in a last level page table entry of the page table hierarchy; and means for performing a translation determination with reference to the page table hierarchy, in response to receipt of the virtual address, wherein an intermediate level page table entry of the page table hierarchy stores an intermediate level pointer to the last level page table entry, and wherein the means for performing the translation determination comprises: means for calculating a higher level pointer to the intermediate level page table entry by applying a first predetermined function to the virtual address; means for calculating the intermediate level pointer by applying a second predetermined function to the virtual address; and means for initiating a memory access to retrieve in parallel the intermediate level pointer from the intermediate level page table entry and the translation from the last level page table entry.

Particular embodiments will now be described with reference to the figures.

FIG. 1A illustrates a data processing apparatus 100 in accordance with one embodiment. The apparatus comprises a processor core 102, a memory management unit (MMU) 104 and a memory 106. One of the tasks of the MMU 104 is to translate addresses, that is to say to convert a virtual address issued by the core 102 (referencing the core's virtual memory view) into a physical address of a real storage location within the memory 106. For this purpose the MMU 104 comprises address translation circuitry 108 more detail of which is given below with reference to the figures which follow.

Figure 1B:
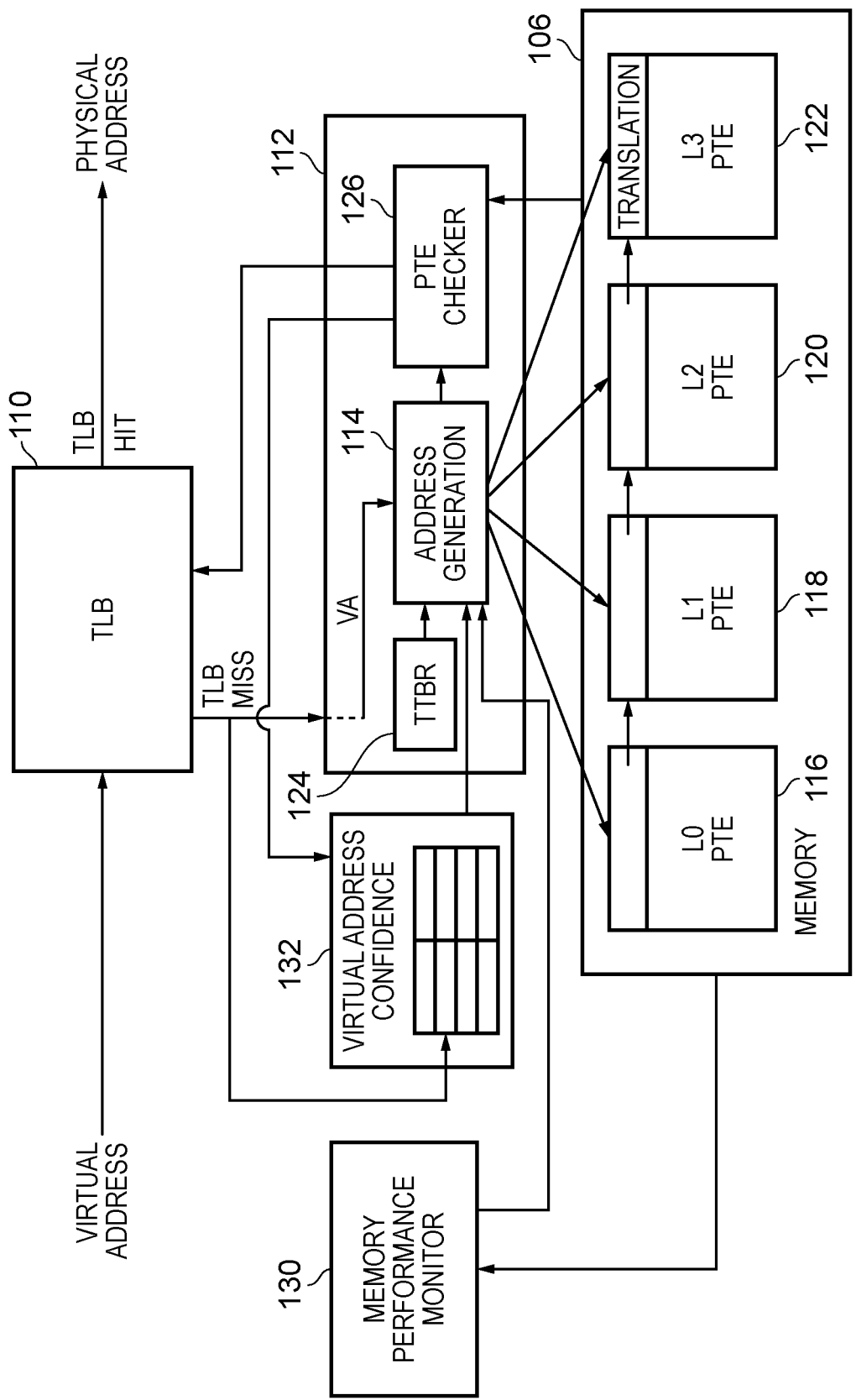
FIG. 1B schematically illustrates address translation circuitry and physical memory which is accessed in one example embodiment.

FIG. 1B schematically illustrates a translation look aside buffer (TLB) 110, address processing circuitry 112, and memory 106. A virtual address is received by the TLB 110 which performs a look up in its cache-like structure and if a TLB hit occurs then the corresponding physical address stored in the TLB is generated as the output. If however a TLB miss occurs an indication of this is passed (including the virtual address) to the address processing circuitry 112 and in particular to the address generation circuitry 114 thereof. The address generation circuitry, in accordance with the present techniques, calculates pointers to page table entries on the basis of the virtual address received. In the example embodiment of FIG. 1B the address generation circuitry 114 calculates four pointers to page table entries at each level of a four level table, these being represented by 116, 118, 120, and 122 within memory 106. This generation of the virtual address is also based on the content of a translation table base register (TTBR) 124 which points to the first level (L0) table. Entries in that page point to the L1 level table, entries at which point to the L2 level table, and entries in the L2 table point to a final L3 translation table that contains the actual mapping between the virtual and the physical address. Accordingly, the four pointers generated by the address generation circuitry 114 can be provided for a simultaneous memory access to four different page table entries in memory. The translation returned from the level 3 page table entry 112 allows the translation of the received virtual address into the physical address and, if correct, the translation is stored in the TLB such that when this virtual address is encountered again in the near future the translation to the physical address may be performed more quickly. The correctness of the translation is checked by page table entry checker circuitry 126 within the address translation circuitry 112. This PTE checker 126 performs the validity check by receiving the concatenation of pointers retrieved from the three respective levels of page table entries which precede the translation and can thus determine if the concatenation of pointers on the basis of the content of the TTBR register 124 (i.e. the pointer to the L0 table does indeed link through to the final translation retrieved from the L3 table). If it does the translation is valid. Some additional components illustrated in FIG. 1B are the memory performance monitor 130 and the virtual address confidence table 132. The memory performance monitor 130 receives indications from the memory 106 of the current memory bandwidth demand and on this basis (in accordance with a set threshold) issues a signal to the address generation circuitry 114. This signal determines the manner in which the address generation circuitry 114 determines the physical address from the virtual address received. When the memory performance monitoring is active (note that it may be selectively disabled) and when the current memory bandwidth demand is below the set threshold the memory performance monitor 130 allows the address generation circuitry to perform the parallelised retrieval of page table pointers from the memory described above. However, when the current memory bandwidth demand reaches the threshold then the memory performance monitor signals to the address generation circuitry that this parallelised access to the memory should be switched off. In such a situation a traditional approach of using a page table walk through the page table hierarchy, i.e. sequentially accessing the pointers, is used in order to retrieve the translation, thus reducing the memory bandwidth of this technique in high bandwidth demand situations. The virtual address confidence table 132 is used to maintain a set of confidences for a stored set of virtual addresses. Accordingly, the virtual address confidence table comprises a set of entries which can store a set of recently seen virtual addresses and a confidence value associated with each. This confidence value can be compared to a threshold value which determines the nature of a signal which the virtual address confidence table sends to the address generation circuitry 114. When the confidence value comparison is active (note that it may be selectively disabled) and when the confidence level is at or above a set threshold value then the address generation circuitry 114 generates a parallelised set of memory accesses to simultaneously retrieve the set of pointers and the translation from memory, whilst when the confidence value falls below the threshold then the traditional page table walk approach is taken. The confidence values for the virtual addresses stored are updated on the basis of the output of the page table entry checker 126 such that a determination that a parallelised retrieval resulted in the correct address translation is used to increase the confidence value associated with the given virtual address, whilst a determination that this resulted in an incorrect translation is used to decrease the virtual address confidence. The confidence value may for example be provide as a limited number of bits such that this increase and decrease saturates at a maximum and minimum value.

Figure 2A:
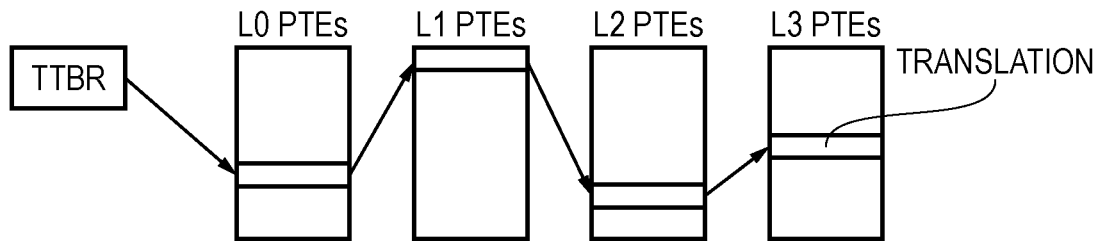
FIG. 2A schematically illustrates a page table hierarchy comprising four levels of page tables, showing an example path via a page table walk through the hierarchy and in which page table entries have been sparsely allocated in memory.
Figure 2B:
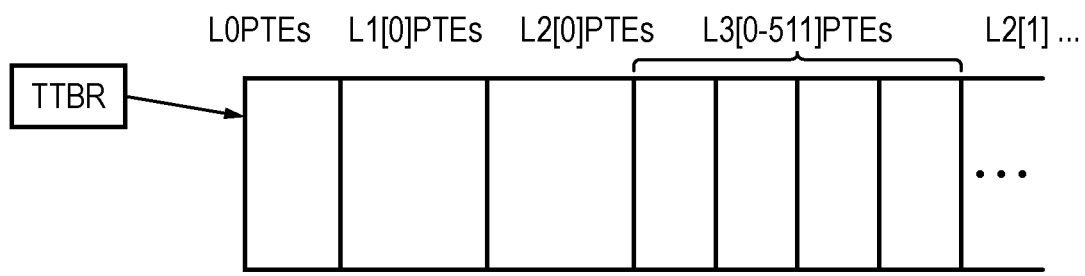
FIG. 2B schematically illustrates a page table hierarchy according to one example embodiment in which page table entries of the page table hierarchy have been allocated in memory in a contiguous manner with respect to a depth-first traversal of the page table hierarchy.

FIG. 2A schematically illustrates a page table hierarchy in which the page table entries have been sparsely allocated in memory. The page table hierarchy comprises four levels of page tables (L0-L3) and an example path taken via a page table walk through the hierarchy is shown. This can be seen to begin at the translation table base register (TTBR), the content of which indicates the location of the first (L0) page table in which a first page table entry comprising a pointer to the next level of the page table hierarchy is to be found. A sequence of pointers thus leads through the page table hierarchy from layer to layer ultimately leading to the required translation at the final (L3) level. The layout schematically shown in FIG. 2A may be compared to that shown in FIG. 2B, in which a page table hierarchy has been allocated in memory in a contiguous manner with respect to a depth-first traversal of the page table hierarchy. Accordingly, the TTBR pointer indicates the first (L0) page table, but the further page tables corresponding to the depth-first traversal of the page table hierarchy are then to be found in contiguous blocks of memory. The notation used in FIG. 2B is also used in FIG. 2C to label the elements of the page table hierarchy in a tree layout and the depth-first traversal of the page table hierarchy is illustrated by means of the dashed line encircling a first (left-most) path from the root node of the tree to a set of leaf nodes at the final (L3) level of the page table hierarchy.

Figure 2C:
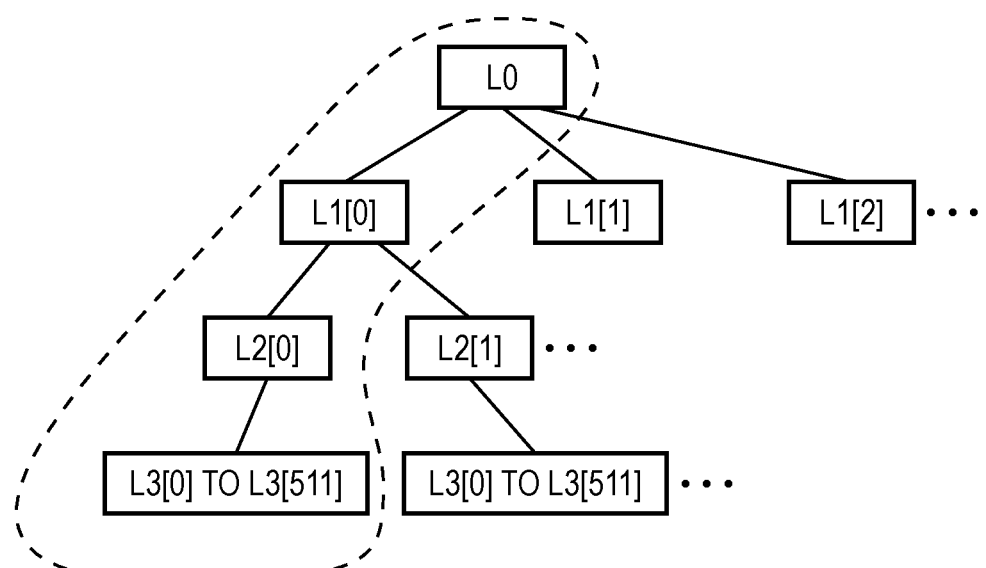
FIG. 2C illustrates in a tree graph manner the layout of the page table hierarchy of FIG. 2B in one example embodiment.
Figure 3A:
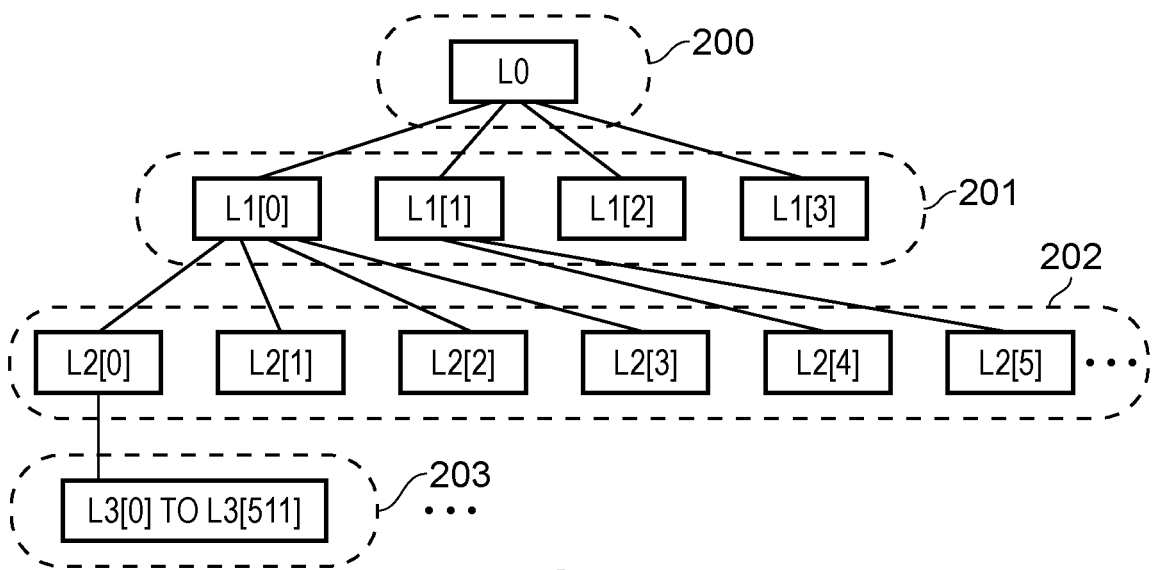
FIG. 3A illustrates in a tree graph manner a page table hierarchy in one example embodiment in which page table entries have been allocated in memory in a breadth-first manner.

FIG. 3A illustrates a page table hierarchy to be compared to that shown in FIG. 2C, wherein the groupings of page table entries shown by the dashed lines in FIG. 3A illustrate an ordering of memory allocation such that these page table entries are allocated in memory in a breadth-first manner with respect to the tree structure of the page table hierarchy. Thus page table entries 200 at the first (L0) level of the page table hierarchy are allocated first are followed by page table entries 201 (L1), followed by page table entries 202 (L2), followed by page table entries 203 (L3). It should be noted therefore with respect to the page table hierarchy illustrated in FIG. 3A that this approach also corresponds to a contiguous allocation in memory of the page table entries, but where the ordering of those page table entries differs with respect to those in the example of FIG. 2C.

Figure 3B:
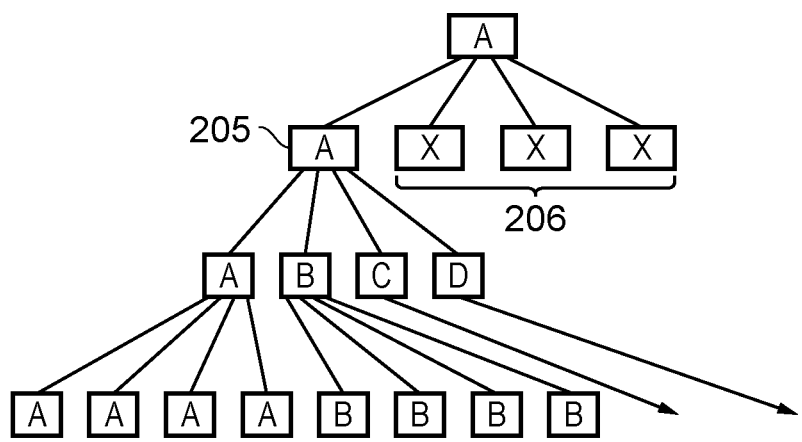
FIG. 3B shows a tree graph representing a page table hierarchy according to which a first set of sub-trees have been allocated in contiguous memory and a further set of sub-trees have been sparsely allocated in memory.
Figure 3C:
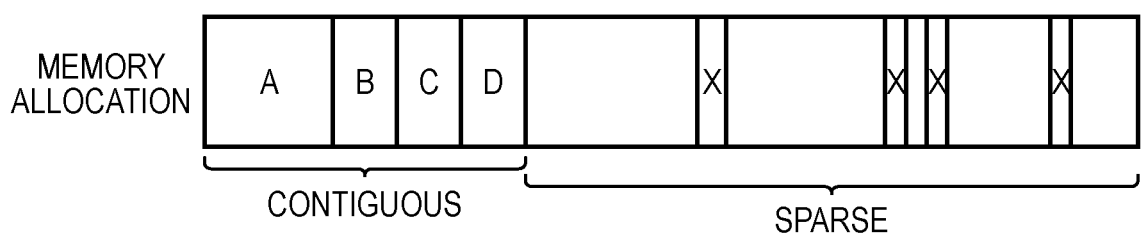
FIG. 3C presents a memory space view of the allocated memory for the page table hierarchy of FIG. 3B.

The illustrations of FIG. 2C and FIG. 3A show how allocations in memory may be made for a set of page table entries which lead from the root node (at L0) to a set of leaf nodes at which translations are stored (at L3), these being allocated depth-first (in FIG. 2C) and breadth-first (in FIG. 3A) respectively. Nevertheless this does not constrain how page table entries for the remainder of the page table hierarchy are allocated. For example, an entire page table hierarchy may be allocated in a depth-first manner. Alternatively an entire page table hierarchy may be allocated in a breadth-first manner. However, with reference to FIGS. 3B and 3C an example is given of a mixed approach to the allocation. The page table hierarchy shown in a simplified format in FIG. 3B uses a labelling to indicate the ordering of allocation such that it can be mapped onto the memory space schematically illustrated in FIG. 3C. It can be seen that a first portion of the page table hierarchy is allocated in a depth-first manner, beginning with the page table entries labelled in A leading from the root node to a first set of leaf nodes, followed by further paths to the final level (leaf nodes) of the hierarchy labelled B, C and D. This corresponds to a sub-tree of page table entries fanning out from the block labelled 205 in FIG. 3B. The set of blocks labelled X 206 at the same level of the tree structure shown in FIG. 3B are sparsely allocated in memory (together with the page table entries below them in the tree structure of FIG. 3B (not illustrated)). This sparse allocation is shown in the memory allocation illustration of FIG. 3C.

Figure 4:
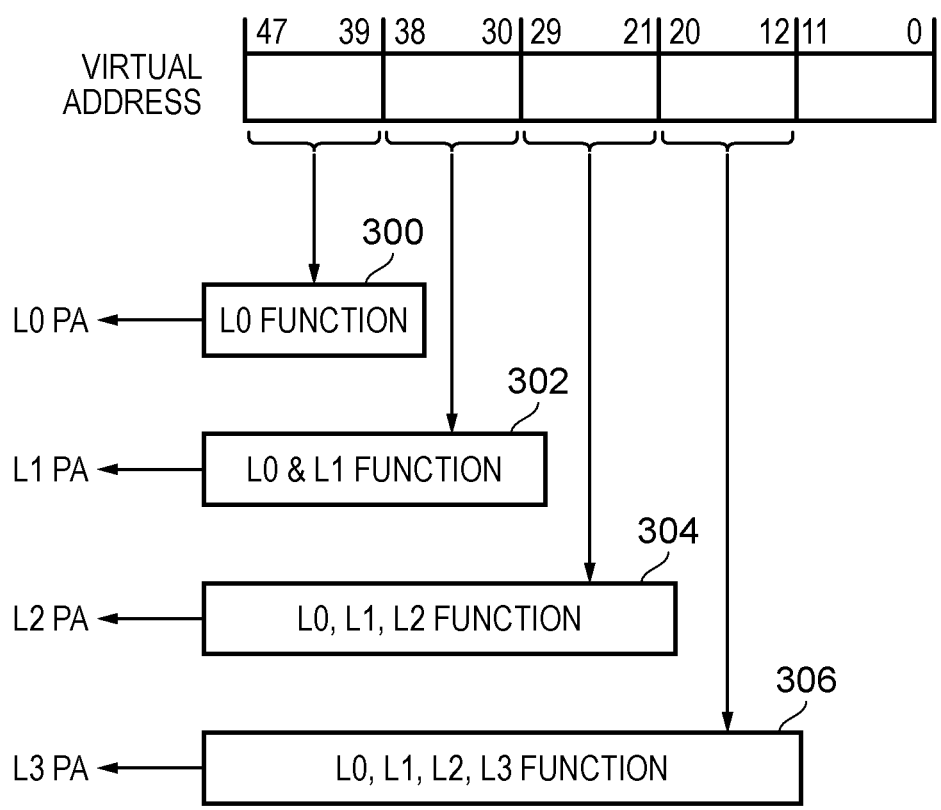
FIG. 4 schematically illustrates the generation of physical addresses for page table entries at four levels of a page table hierarchy on the basis of portions of a virtual address in one example embodiment.

The predetermined function or functions which are used to translate the virtual address into pointers to a particular page table entries may be variously defined. One example approach is schematically illustrated in FIG. 4. A 48-bit address space of the virtual address is shown divided into five portions, four of which are used in order to calculate physical addresses at the different levels of the page table hierarchy. FIG. 4 shows the uppermost set of bits of the virtual address ([47:39]) being used with a function 300 to generate a L0 physical address. The next portion of the virtual address (bits [38:30]) are used together with the L0 portion of the virtual address as the input to a L0 and L1 function 302 to calculate a L1 physical address. A third portion of the virtual address (bits [29:21]), and the bits above this in the virtual address, are the input to function 304 which calculates a L2 physical address. Finally, a further portion of the virtual address ([20:121]) together with the bits above this form the input to a function 306 which calculates a L3 physical address.

As an example of the functions which may be used and the corresponding portions of the virtual address which are applied to them there follows an example of a fully populated depth-first tree layout in memory, corresponding to a 48-bit address space and 4 kB granules, where the following equation can be used to get the L3 table from the TTBR register:

Physical Address ($L3$ entry) =
$$TTBR_0 + (((2^{18} + 2^9)(VA[47:39]) + 1) + (2^9 * VA[38:30] + 1) +$$
$$(VA[29:21] + 1)) * 2^{12}) + VA[20:12] * 8$$

To access the intermediate table entries, the following equations are be used:

Physical Address ($L0$ entry) = $TTBR_0 + VA[47:39] * 8$

Physical Address ($L1$ entry) =
$$TTBR_0 + ((2^{18} + 2^9)(VA[47:39]) + 1) * 2^{12} + VA[38:30] * 8$$

Physical Address ($L2$ entry) = $TTBR_0 + ((2^{18} + 2^9)(VA[47:39]) + 1) +$
$$(2^9 * VA[38:30])) * 2^{12} + VA[29:21] * 8$$

Note that for the above address calculations all the multiplications are by powers of 2, which can be accomplished entirely by shift operations with no need for a full multiplier in the MMU.

As mentioned above, the table layout could also be implemented as a breadth-first fully populated tree. This layout can also enable parallel page table walks because the addresses of each directory can be pre-calculated by the MMU. The address for each level of PTEs can also be pre-calculated similarly to the depth first tree, where for the intermediate table entries the following equations are used:.

Physical Address $L0$ entry = $TTBR_0 + VA[47:39] * 8$

Physical Address $L1$ entry =
$$TTBR_0 + 2^{12} + ((2^9)(VA[47:39])) * 2^{12} + VA[38:30] * 8$$

Physical Address $L2$ entry = $TTBR0 + 2^{12} + ((2^9)) * 2^{12} +$
$$(2^{18} * VA[47:39] + 2^9 * VA[38:30])) * 2^{12} + VA[29:21] * 8$$

This breadth-first tree implementation also allows for pre-calculated page table directories, although it should be noted that the memory space overhead required is much greater than the depth-first tree implementation because the intermediate directories (L1, L2) have to be completely allocated in their entirety before the L3 directories. For this reason the depth-first layout may be preferred over the breadth-first tree layout in terms of flexibility and space.

Figure 5A:
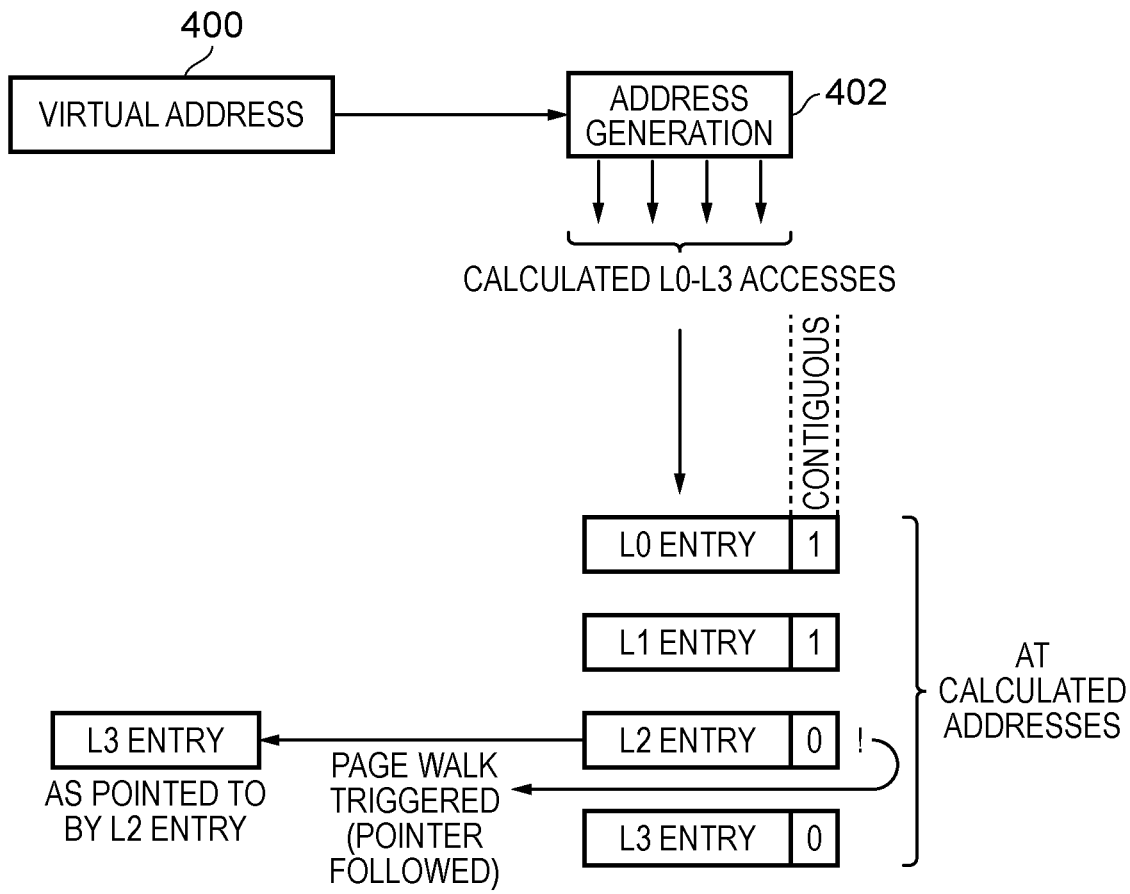
FIG. 5A schematically illustrates parallel memory accesses to four levels of a page table hierarchy and the use of a contiguous bit to indicate contiguous memory allocation in one example embodiment.

As mentioned above, the present techniques recognise that the page table hierarchy may be allocated in memory in a mixed manner i.e. where some of the page table hierarchy is contiguously allocated (e.g. depth-first) in memory, but a further portion of the page table hierarchy is sparsely allocated (requiring a page table walk). The present techniques recognise that this in fact may provide a useful balance in an implemented system. To support this mixed approach and also to support the checking of the validity of page table entries the page table entries themselves can be provided with a flag indicating whether the sub-tree to which the pointer is pointing is (at least partially) laid out in the contiguous (fully populated) data structure manner. This flag can be provided at every level of page table entries from the TTBR register through all the levels. When the flag is not set the page table walk approach can be taken in a sequential walk and when a page table entry with the flag set is encountered a shift to using the parallelised memory access method described above can be made. Conversely, the contiguous flag may be set (and thus the parallel memory access method may be used) for the first levels of the page table hierarchy encountered, but if a level is encountered at which the entry does not have the contiguous flag set then a subsequent page table walk can be triggered. This is schematically illustrated in FIG. 5A where an incoming virtual address 400 is used by address generation circuitry 402 to generate four parallel memory accesses (to levels L0-L3) and the presence of the non-set contiguous flag at L2 triggers a page walk by means of which the L3 entry is retrieved, i.e. the pointer of the L2 entry is followed.

Figure 5B:
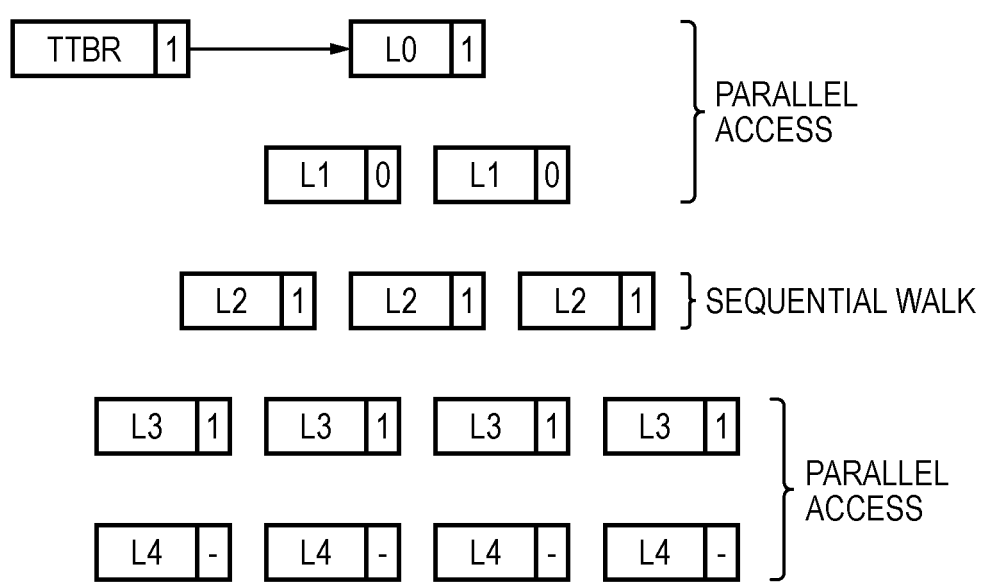
FIG. 5B schematically illustrates an example page table hierarchy in one example embodiment in which a subset of levels are contiguously allocated in memory and can be accessed in parallel whilst another subset of the levels is sparsely allocated in memory and is accessed via a sequential walk.

In a given page table hierarchy the "contiguous" bit in page table entries can also be set/un-set in the middle of the page table structure to allow for more granular parallel accesses as is shown in FIG. 5B. FIG. 5B shows a five level page table example in which the upper two levels (L0, L1) are contiguously allocated page table entries, whilst the L2 page table entries must be accessed via page table walk, and the lowest two levels (L3, L4) may again be accessed in parallel. Note that the TTBR register can also comprise the contiguous bit since this indicates the nature of the page table entry at L0. Hence in the example of FIG. 5B the contiguously allocated bit is set for the TTBR register and the L0 level which then means that the L0 and L1 tables are allocated contiguously. The L1 page table entries do not have the contiguous bit set and the sequential walk is used to access the L2 level. The entries themselves at the L2 level have the contiguously allocated bit set and thus parallel loads can be generated for the L3 and L4 table entries.

Figure 6:
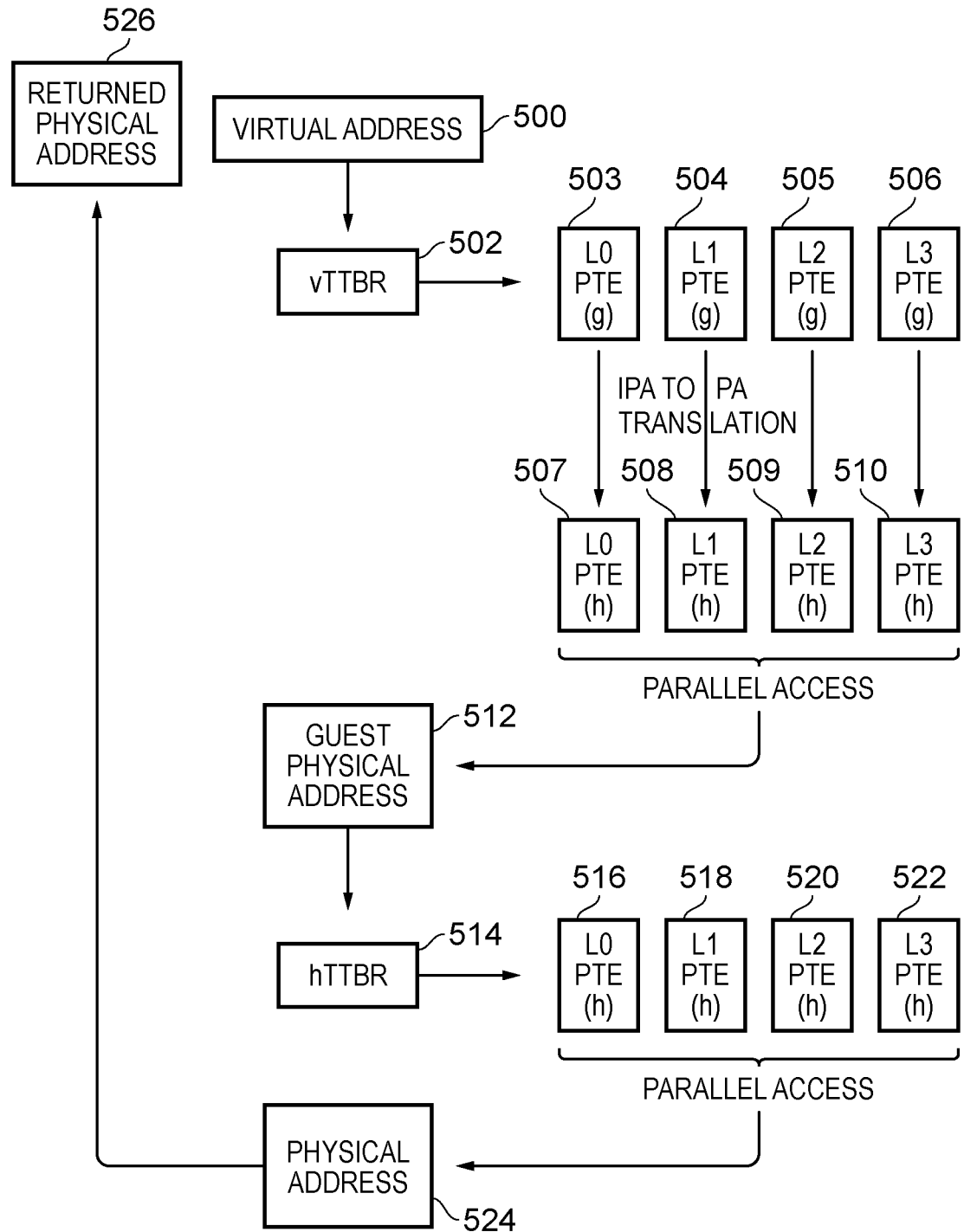
FIG. 6 schematically illustrates the translation of a virtual address into a physical address in a system supporting virtualisation wherein the virtual address is first translated into a guest physical address (intermediate physical address) with reference to a virtual page table hierarchy and subsequently the guest physical address is translated into a physical address with reference to a host page table hierarchy in one example embodiment.

The translation of a virtual address into a physical address need not be direct, for example in the context of a virtualised operating system in which virtual addresses (used in software being executed) are first translated into a guest (intermediate) physical address, which in turn is then translated into a physical address corresponding to the hardware on which the virtualised system is operating. FIG. 6 schematically illustrates the manner in which the present techniques may be applied to this situation and as can be seen in the illustration in FIG. 6 a number of translation processes occur. Firstly, a virtual address 500 combined with the content of a virtual translation table base register (vTTBR) 502 can be used to generate pointers to four different levels of a guest page table hierarchy 504, 506, 508, 510. It should be appreciated that each of these pointers (addresses) are guest (intermediate) addresses, which themselves each need to be translated into physical addresses so that the respective PTEs can actually be accessed. This in fact requires each of these guest (intermediate) addresses to pass through the guest (intermediate) to physical address translation process, but this is not explicitly illustrated (merely to preserve the clarity of the illustration) and is summarised in FIG. 6 by the conversion ("IPA to PA translation") of the set of guest (g) addresses 503, 504, 505, 506 into the set of physical (h—host) addresses 507, 508, 509, 510. Hence, accessing this set of physical addresses, and in particular the physical address of the last level guest page table entry 510 generates a guest physical address 512 to return from this part of the process. This guest physical address 512 together with the content of a host translation table base register (hTTBR) 514 enables a set of four pointers 516, 518, 520, 522 to be generated to four different levels of a separate host page table hierarchy such that these can be accessed in parallel. The translation into a physical address 524 then provides the returned physical address 526 corresponding to the original virtual address 500. Reference may also be made to the description below of examples of how address translations for virtual to physical addresses (or for intermediate physical addresses to physical addresses) are made in one embodiment and how address translations for virtual to physical addresses (or for intermediate physical addresses to physical addresses) are made in one embodiment.

Figure 7:
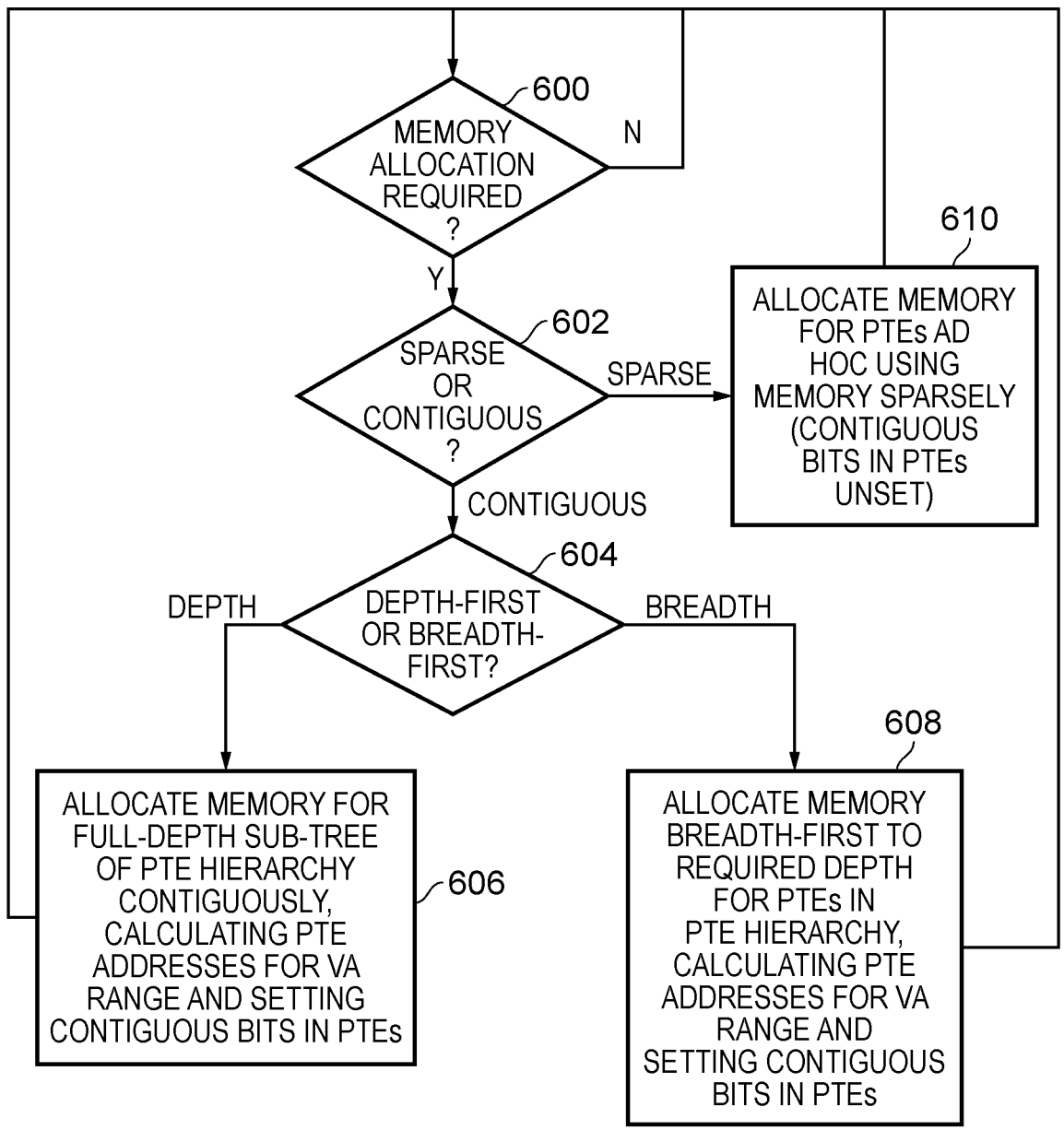
FIG. 7 is a flow diagram illustrating a sequence of steps which are taken when memory allocation is required for defining page table entries in one example embodiment.

FIG. 7 is a flow diagram showing a sequence of steps which are taken when memory allocation for page table entries in a page table hierarchy is required. The flow can be considered to begin at step 600 where the process waits until memory allocation is required. When it is the flow proceeds to step 602 where it is determined if this should be sparse (ad-hoc) or contiguous memory allocation. When contiguous memory allocation is required it is then determined at step 604 if this should be depth-first or breadth-first. For depth-first allocation the flow proceeds to step 606 where a full depth sub-tree of the page table entry hierarchy is allocated in contiguous memory. Further, in the example of FIG. 7 the contiguous bits at each page table entry are set. The flow then returns to step 600. If however, at step 604 it is determined that breadth-first allocation is required then the flow proceeds to step 608 where memory is allocated in a breadth-first manner to a required depth in the page table hierarchy. Further in the example of FIG. 7 contiguous bits are set to indicate the contiguous portions of memory. The flow then returns to step 600. Finally, returning to a consideration of step 602 if it is determined that sparse memory allocation is appropriate then the flow proceeds to step 610 where the memory allocation for the page table entries is allocated in a (traditional) ad-hoc manner according to memory availability. In the example of FIG. 7 (where contiguous bits are provided in the page table entries) these are not set for the sparsely allocated page table entries.

Figure 8:
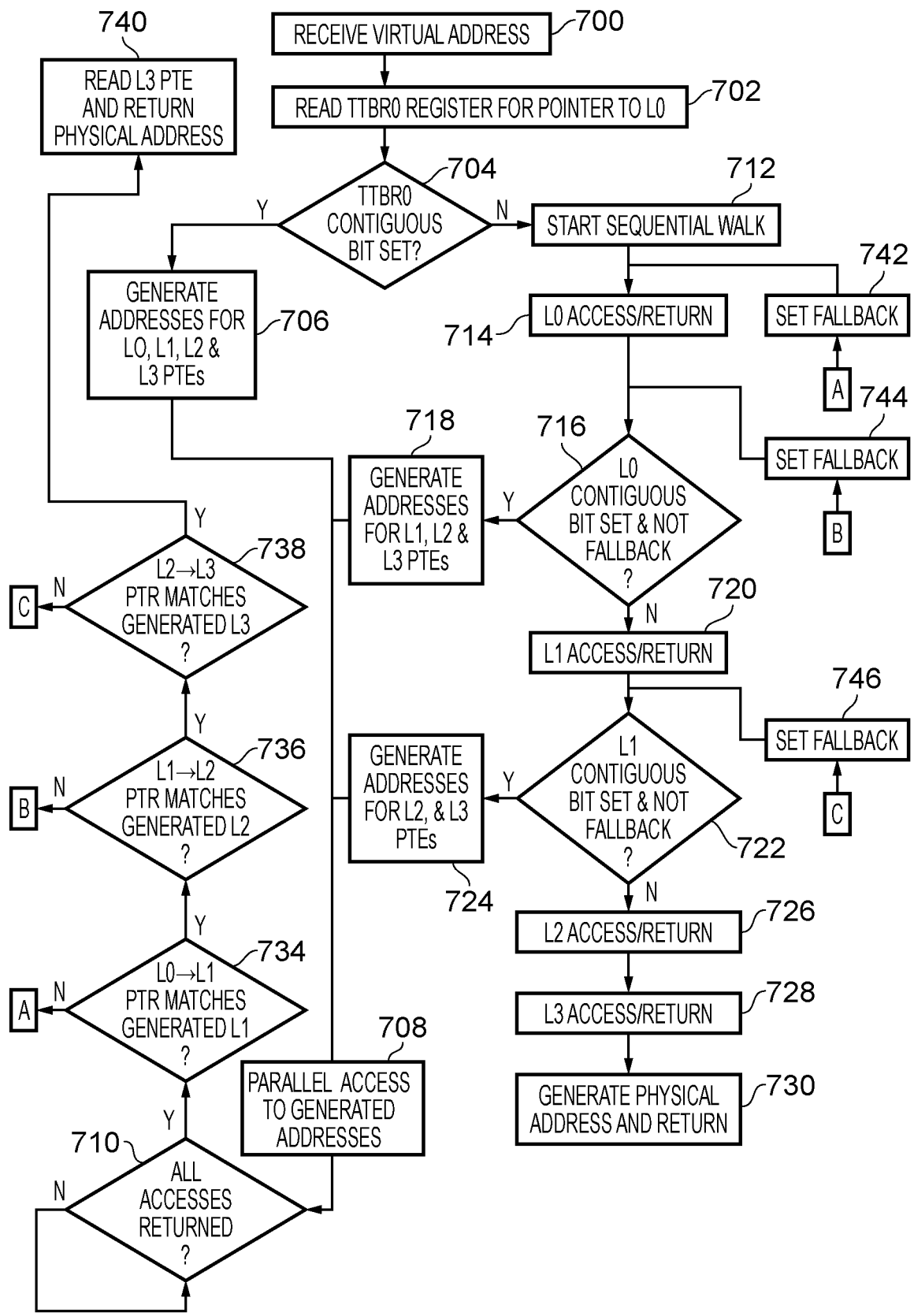
FIG. 8 is a flow diagram showing a sequence of steps which are taken in order to translate a received virtual address into a physical address in one example embodiment.

FIG. 8 shows a sequence of steps which are taken in one example embodiment in order to translate a received virtual address into a returned physical address. The flow begins at step 700 where the virtual address is received. Then at step 702 a level 0 TTBR register (TTBR0) is read to determine the pointer to L0 of the page table hierarchy. It is then determined at step 704 if the TTBR0 contiguous bit is set. If it is then the flow proceeds to step 706 where, on the basis of respective portions of the received virtual address, addresses are generated for the L0, L1, L2 and L3 page table entries and at step 708 these four locations are accessed in parallel. The flow then waits at step 710 until all accesses have returned from memory. Returning to a consideration of step 704 if it is determined there that the contiguous bit is not set then the flow proceeds to step 712 where a sequential page table walk is initiated, this firstly accessing L0 at step 714. When the L0 access returns, it is then determined at step 716 if the contiguous bit is set in the page table entry accessed at L0 and if this is not "fall back". "Fallback" will be explained in more detail below. This being the case then the flow proceeds to step 718 where addresses are generated for page table entries at L1, L2, and L3. The flow then proceeds to step 708, where these three locations are accessed in parallel. If however at step 716 the condition is not true then a further sequential access is made, this being to L1 at step 720. When the L1 access returns, the flow proceeds to step 722 where it is determined if the page table entry at L1 has the contiguous bit set and if this is not "fallback". This being the case then addresses are generated (on the basis of the relevant portions of the virtual address for page table entries at L2 and L3 (step 724). The flow then proceeds to step 708, where these two locations are accessed in parallel. If however, the condition at step 722 is not true then a further sequential page table walk step is taken, now to L2 (step 726). Then, at step 728 a further sequential access is made to the L3 page table entry. On the return of the L3 access the virtual to physical address translation (VA to PA) is generated and returned (i.e. typically to the processor core).

As mentioned above, the flow waits at step 710 until accesses from all four levels have been returned. Then a validation process then begins, starting at step 734 where it is determined if the pointer at L0 (i.e. pointing to a page table entry at L1) matches the generated L1 page table entry (i.e. the location thereof). If this is true then the flow proceeds to step 736, where a similar check is made to determine if the L1 pointer (pointing to L2) matches the generated L2 pointer. Finally the same check is done for a L2 pointer pointing to L3 to determine if it matches the generated L3 pointer at step 738. If each of these checks confirms that the generated pointers were correct then the flow proceeds to step 740 where the level 3 page table entry is read providing the translation for the virtual address and the required physical address is returned. Returning to a consideration of steps 734, 736 and 738 if the check at any of these steps fails then the flow links back into a required stage of a sequential walk process and the "fallback" flag is set. Accordingly, if this verification at step 734 fails then the flow proceeds to step 742 to set the fallback flag and then to step 714 for a sequential access to a level 0 page table entry (using the TTBR0 content) is performed. Similarly if the check at step 736 fails then at step 744 the fallback flag is set and the flow then continues to step 716. Here it can be seen that the setting of the fallback flag then forces the flow from step 716 to step 720 for a sequential L1 access to be made. Similarly at step 738 in the case that the pointer does not match the generated location then the flow proceeds to step 746 for the fallback flag to be set and then proceeds to step 722 where the set fallback flag then forces the flow to follow to a sequential access to the L2 page table entry at step 726.

The steps of FIG. 8 may also be set out as follows showing the procedure for "native" translation (VA->PA or IPA->PA). Here VA=Virtual Address; IPA=Intermediate Physical Address (or Guest Physical Address); PA=Physical Address; and gVA=guest Virtual Address.
1) Read TTBR0 register for pointer to L0
2) If "contiguous allocation set", generate addresses for L0, L1, L2 and L3 PTEs
   a. Goto "Validate translation"
3) Else start sequential walk
4) Generate L0 access
5) L0 entry return
   a. if "contiguous allocation set" and not "fallback", generate addresses for L1, L2, L3
     i. Goto "Validate translation"
   b. else generate L1 access
6) L1 entry return
   a. If "contiguous allocation set" and not "fallback", generate addresses for L2, L3
     i. Goto "Validate translation"
   b. Else generate L2 access
7) L2 entry return
   a. Generate L3 access
8) L3 entry return—generate VA to PA translation for core; end.
9) "Validate Translation" (once all outstanding requests return for translation):
   a. Check if L0->L1 ptr matches generated L1 else set "fallback" and goto (4)
   b. Check if L1->L2 ptr matches generated L2 else set "fallback" and goto (5)
   c. Check if L2->L3 ptr matches generated L3 else set "fallback" and goto (6)
   d. Read L3 entry and generate VA to PA translation for core; end.

Referring again to the example described with reference to FIG. 6, a variant on the above described steps is set out below, which gives the procedure for "nested" translation (gVA->PA).
1) Read vTTBR0 register for IPA pointer to L0
2) If "contiguous allocation set", generate IPA address for L0, L1, L2 and L3 PTEs in the guest machine
   a. For each generated IPA use IPA->PA "native" translation to access
   b. Go to "Validate translation"
3) Else start sequential nested walk
4) Generate guest L0 IPA access
   a. Use translation from "native" translation to get PA of L0 table entry
5) Guest L0 entry return
   a. If "contiguous allocation set" and not "fallback", generate IPA addresses for guest L1, L2, and L3
     i. For each generated IPA use IPA->PA "native" translation to access
     ii. Goto "Validate translation"
   b. Else generate guest L1 IPA access
     i. Use "native" translation to get PA of L1 table entry and access
6) Guest L1 entry return
   a. If "contiguous allocation set" and not "fallback" generate IPA addresses for guest L2, L3
     i. For each generated IPA use IPA->PA "native" translation to access
     ii. Goto "Validate translation"
   b. Else generate L2 IPA access
     i. Use "native" translation to get PA of L2 table entry and access
7) Guest L2 entry return
   a. Generate L3 IPA access
     i. Use "native" translation to get PA of L3 table entry and access
8) Guest L3 entry return
   a. Read IPA from L3 entry
     i. Use "native" translation to get PA of IPA in L3 entry and return to core; end.
9) "Validate Translation" (once all outstanding requests return for translation):
   a. Check if L0->L1 IPA ptr matches generated L1 else set "fallback" and goto (4)
   b. Check if L1->L2 IPA ptr matches generated L2 else set "fallback" and goto (5)
   c. Check if L2->L3 IPA ptr matches generated L3 else set "fallback" and goto (6)
   d. Read L3 entry and Goto (8)

In brief overall summary address translation circuitry performs virtual-to-physical address translations using a page table hierarchy of page table entries, wherein a translation between a virtual address and a physical address is defined in a last level page table entry of the page table hierarchy. The address translation circuitry is responsive to receipt of the virtual address to perform a translation determination with reference to the page table hierarchy, wherein an intermediate level page table entry of the page table hierarchy stores an intermediate level pointer to the last level page table entry. The translation determination comprises: calculating a higher level pointer to the intermediate level page table entry by applying a first predetermined function to the virtual address, calculating the intermediate level pointer by applying a second predetermined function to the virtual address, and initiating a memory access to retrieve in parallel the intermediate level pointer from the intermediate level page table entry and the translation from the last level page table entry.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. Apparatus comprising:
    address translation circuitry to perform virtual-to-physical address translations using a page table hierarchy of page table entries, wherein a translation between a virtual address and a physical address is defined in a last level page table entry of the page table hierarchy,
    wherein the last level page table entry contains an actual mapping between the virtual address and the physical address,
    wherein the address translation circuitry is responsive to receipt of the virtual address to perform a translation determination with reference to the page table hierarchy, wherein an intermediate level page table entry of the page table hierarchy stores an intermediate level pointer to the last level page table entry, and wherein the translation determination comprises:
    calculating a higher level pointer than the intermediate level page table entry directly from the virtual address by applying a first predetermined function to the virtual address;
    calculating the intermediate level pointer directly from the virtual address by applying a second predetermined function to the virtual address independent of the intermediate level page table entry; and
    initiating a memory access to retrieve in parallel the intermediate level pointer from the intermediate level page table entry and the translation from the last level page table entry.

2. The apparatus as claimed in claim 1, wherein the page table hierarchy comprises multiple intermediate levels of page table entries and the higher level pointer is a further intermediate level pointer stored in a further intermediate level page table entry of the page table hierarchy, and wherein the translation determination further comprises:
    calculating a still higher level pointer to the further intermediate level page table entry by applying a third predetermined function to the virtual address; and
    initiating the memory access to further retrieve in parallel the further intermediate level pointer from the further intermediate level page table entry.

3. The apparatus as claimed in claim 1, wherein calculating the higher level pointer to the intermediate level page table entry comprises applying the first predetermined function to a first portion of the virtual address, and calculating the intermediate level pointer comprises applying the second predetermined function to a second portion of the virtual address.

4. The apparatus as claimed in claim 2, wherein calculating the still higher level pointer to the further intermediate level page table entry comprises applying the third predetermined function to a third portion of the virtual address.

5. The apparatus as claimed in claim 1, wherein the apparatus is arranged to allocate memory for the page table hierarchy of page table entries by performing a depth-first allocation procedure for a first sub-tree of the page table hierarchy comprising the intermediate level page table entry and the last level page table entry, such that page table entries of the first sub-tree are allocated in a contiguous block of memory.

6. The apparatus as claimed in claim 5, wherein the apparatus is arranged to perform at least one further depth-first allocation procedure for at least one further sub-tree of the page table hierarchy comprising at least one intermediate level page table entry and at least one last level page table entry, such that page table entries of the at least one further sub-tree are allocated in the contiguous block of memory.

7. The apparatus as claimed in claim 5, wherein the apparatus is arranged to perform a sparse allocation procedure for at least one further sub-tree of the page table hierarchy comprising at least one intermediate level page table entry and at least one last level page table entry, such that page table entries of the at least one further sub-tree are allocated in memory locations selected according to availability when the sparse allocation procedure is performed.

8. The apparatus as claimed in claim 1, wherein the apparatus is arranged to allocate memory for the page table hierarchy of page table entries, wherein the memory allocation circuitry is arranged to perform a breadth-first allocation procedure for the page table hierarchy, such that page table entries in each level of the page table hierarchy are allocated in a contiguous block of memory.

9. The apparatus as claimed in claim 1, wherein the translation determination further comprises:
    verifying whether at least one of the intermediate level page table entry and the last level page table entry is an invalid page table entry; and
    when at least one of the intermediate level page table entry and the last level page table entry is found to be the invalid page table entry, initiating a page-table-walk from a pointer at a higher level than the invalid page table entry to retrieve the translation.

10. The apparatus as claimed in claim 9, wherein the address translation circuitry is arranged to provide the address translation speculatively before the verifying whether at least one of the intermediate level page table entry and the last level page table entry is the invalid page table entry has been completed.

11. The apparatus as claimed in claim 5, wherein each page table entry of the page table hierarchy of page table entries comprises a contiguous allocation flag, and wherein apparatus is arranged to set the contiguous allocation flag for a first page table entry which points to a second page table entry which is allocated in the contiguous block of memory.

12. The apparatus as claimed in claim 11, wherein the address translation circuitry is responsive to receipt of a page table entry retrieved by the memory access for which the contiguous allocation flag is not set to initiate a page-table-walk from the page table entry for which the contiguous allocation flag is not set to retrieve the translation.

13. The apparatus as claimed in claim 12, wherein the apparatus is arranged to:
   allocate memory in a first contiguous block for page table entries of a first set of levels of the page table hierarchy of page table entries and to set the contiguous allocation flag for the page table entries of the first set of levels; and
   allocate memory sparsely for page table entries of a second set of levels of the page table hierarchy of page table entries and to not set the contiguous allocation flag for the page table entries of the second set of levels.

14. The apparatus as claimed in claim 13, wherein the first set of levels of the page table hierarchy of page table entries and the second set of levels of the page table hierarchy of page table entries are at least partially interleaved.

15. The apparatus as claimed in claim 1, further comprising memory performance monitoring circuitry to monitor current memory bandwidth demand, wherein the address translation circuitry is responsive to the current memory bandwidth demand being below a threshold to use the translation determination to retrieve the translation and is responsive to the current memory bandwidth demand being above the threshold to use a page-table-walk through the page table hierarchy to retrieve the translation.

16. The apparatus as claimed in claim 1, further comprising virtual address confidence storage to store a confidence value in association with virtual addresses, wherein the address translation circuitry is responsive to the confidence value being above a threshold to use the translation determination to retrieve the translation and is responsive to the confidence value being below the threshold to use a page-table-walk through the page table hierarchy to retrieve the translation.

17. The apparatus as claimed in claim 1, wherein the apparatus is arranged to provide a hardware virtualization environment, and wherein the address translation circuitry is arranged to receive the virtual address from a guest machine running in the hardware virtualization environment, wherein the page table hierarchy is a guest page table hierarchy, and the translation is from the virtual address to a guest physical address,
   and wherein the address translation circuitry is responsive to the translation into the guest physical address to perform a further translation determination with reference to a host page table hierarchy to translate the guest physical address into a host physical address.

18. A method of operating address translation circuitry to perform virtual-to-physical address translations, the method comprising the steps of:
   defining a page table hierarchy of page table entries, wherein a last level page table entry of the page table hierarchy contains the actual mapping between the virtual and the physical address,
   wherein the last level page table entry points directly to the physical address; and
   in response to receipt of the virtual address, performing a translation determination with reference to the page table hierarchy, wherein an intermediate level page table entry of the page table hierarchy stores an intermediate level pointer to the last level page table entry, and wherein performing the translation determination comprises:
   calculating a higher level pointer than the intermediate level page table entry directly from the virtual address by applying a first predetermined function to the virtual address;
   calculating the intermediate level pointer directly from the virtual address by applying a second predetermined function to the virtual address independent of the intermediate level page table entry; and
   initiating a memory access to retrieve in parallel the intermediate level pointer from the intermediate level page table entry and the translation from the last level page table entry.

19. Apparatus for performing virtual-to-physical address translations, the apparatus comprising:
   means for defining a page table hierarchy of page table entries, wherein a last level page table entry of the page table hierarchy contains the actual mapping between the virtual and the physical address,
   wherein the last level page table entry points directly to the physical address; and
   means for performing a translation determination with reference to the page table hierarchy, in response to receipt of the virtual address, wherein an intermediate level page table entry of the page table hierarchy stores an intermediate level pointer to the last level page table entry, and wherein the means for performing the translation determination comprises:
   means for calculating a higher level pointer than the intermediate level page table entry directly from the virtual address by applying a first predetermined function to the virtual address;
   means for calculating the intermediate level pointer directly from the virtual address by applying a second predetermined function to the virtual address independent of the intermediate level page table entry; and
   means for initiating a memory access to retrieve in parallel the intermediate level pointer from the intermediate level page table entry and the translation from the last level page table entry.

* * * * *